(12) United States Patent
Lee et al.

(10) Patent No.: US 12,432,043 B2
(45) Date of Patent: Sep. 30, 2025

(54) HOMOMORPHIC ENCRYPTION APPARATUS AND METHOD

(71) Applicant: Samsung Electronics Co., Ltd., Suwon-si (KR)

(72) Inventors: Yongwoo Lee, Suwon-si (KR); Andrey Kim, Suwon-si (KR); Maksim Deriabin, Suwon-si (KR); Jieun Eom, Suwon-si (KR); Dong-Hoon Yoo, Suwon-si (KR); Rakyong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 17/994,294

(22) Filed: Nov. 26, 2022

(65) Prior Publication Data
US 2023/0171085 A1 Jun. 1, 2023

(30) Foreign Application Priority Data

Nov. 26, 2021 (KR) .................... 10-2021-0165597
Oct. 6, 2022 (KR) .................... 10-2022-0127784

(51) Int. Cl.
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
CPC ...... H04L 9/008; H04L 9/0618; H04L 9/3093
See application file for complete search history.

(56) References Cited

U.S. PATENT DOCUMENTS

| | | | |
|---|---|---|---|
| 2002/0135307 A1* | 9/2002 | Cousy ................ | G05B 19/425 315/76 |
| 2021/0119766 A1 | 4/2021 | Suresh et al. | |
| 2022/0376890 A1* | 11/2022 | Eom .................... | H04L 9/0891 |
| 2022/0385461 A1* | 12/2022 | Eom .................... | H04L 9/0618 |
| 2023/0171085 A1* | 6/2023 | Lee ...................... | H04L 9/008 380/28 |
| 2023/0246807 A1* | 8/2023 | Lee ...................... | H04L 9/0866 713/168 |

OTHER PUBLICATIONS

FDFB: Full Domain Functional Bootstrapping Towards Practical Fully Homomorphic Encryption, Kamil Kluczniak (Year: 2021).*

(Continued)

*Primary Examiner* — Gary S Gracia
(74) *Attorney, Agent, or Firm* — NSIP Law

(57) ABSTRACT

A homomorphic encryption apparatus and method are disclosed. The homomorphic encryption apparatus includes one or more processors, and memory storing instructions configured to, when executed by the one or more processors, cause the one or more processors to receive a blind rotation key for performing a blind rotation operation and receive an operand ciphertext of the blind rotation operation, generate a first ciphertext by performing addition of a polynomial representation based on the blind rotation key and the operand ciphertext, and generate a target ciphertext by performing key switching and accumulative multiplication based on the first ciphertext.

21 Claims, 9 Drawing Sheets

(56) References Cited

OTHER PUBLICATIONS

Han, Kyoohyung, and Dohyeong Kl. "Better bootstrapping for approximate homomorphic encryption." *Cryptographers' Track at the RSA Conference*. Springer, Cham, 2020.

Micciancio, Daniele, and Yuriy Polyakov. "Bootstrapping in FHEW-like cryptosystems." *Proceedings of the 9th on Workshop on Encrypted Computing & Applied Homomorphic Cryptography*. (Oct. 23, 2022) pp. 1-23.

Chillotti, Ilaria, et al. "CONCRETE: Concrete operates on ciphertexts rapidly by extending TfhE." *WAHC 2020—8th Workshop on Encrypted Computing & Applied Homomorphic Cryptography*. vol. 15. 2020.

Ducas, Léo, and Daniele Micciancio. "FHEW: bootstrapping homomorphic encryption in less than a second." *Annual international conference on the theory and applications of cryptographic techniques*. Springer, Berlin, Heidelberg, 2015.

Kim, Andrey, et al. "General bootstrapping approach for RLWE-based homomorphic encryption." *Cryptology ePrint Archive* (Sep. 27, 2021).

Chillotti, Ilaria, et al. "TFHE: fast fully homomorphic encryption over the torus." *Journal of Cryptology* 33.1 (2020): pp. 34-91.

\* cited by examiner

HOMOMORPHIC ENCRYPTION APPARATUS AND METHOD

CROSS-REFERENCE TO RELATED APPLICATIONS

This application claims the benefit under 35 USC § 119(a) of Korean Patent Application No. 10-2021-0165597, filed on Nov. 26, 2021 and Korean Patent Application No. 10-2022-0127784, filed on Oct. 6, 2022, in the Korean Intellectual Property Office, the entire disclosures of which are incorporated herein by reference for all purposes.

BACKGROUND

1. Field

The following description relates to a homomorphic encryption apparatus and method.

2. Description of Related Art

Homomorphic encryption is a promising encryption method that enables arbitrary operations on encrypted data without decrypting the encrypted data. Homomorphic encryption may be lattice-based and thus may be resistant to quantum cryptanalysis algorithms.

A blind rotation can be used to perform arbitrary function operations on ciphertext messages in the homomorphic encryption and provides high accuracy for operation results, but has the disadvantage of a significantly large size of a public key, which increases computation costs, key management costs, key generation, and so forth.

Although there are various technologies for reducing the size of the public key, the blind rotation operation still requires significant memory. Computational costs can significantly decrease when the size of the public key necessary for blind rotation is reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a homomorphic encryption operation apparatus includes one or more processors, and memory storing instructions configured to, when executed by the one or more processors, cause the one or more processors to receive a blind rotation key for performing a blind rotation operation and receive an operand ciphertext of the blind rotation operation generate a first ciphertext by performing addition of a polynomial representation based on the blind rotation key and the operand ciphertext and generate a target ciphertext by performing key switching and accumulative multiplication based on the first ciphertext.

A Hamming weight of a secret key is used to generate the blind rotation key.

The operand ciphertext may be a learning with error (LWE) ciphertext, and the target ciphertext may be a ring learning with error (RLWE) ciphertext.

The one or more processors may generate the first ciphertext based on a variable of a polynomial representation constituting the blind rotation key and based on an index corresponding to an odd exponent of the variable.

The one or more processors may generate the target ciphertext in the form of an RLWE ciphertext by performing the accumulative multiplication based on an RLWE ciphertext based on a secret key of the operand ciphertext and a key-switched ciphertext.

The one or more processors may generate a key-switched ciphertext by performing the key switching on the first ciphertext, and generate the target ciphertext by performing the accumulative multiplication based on the key-switched ciphertext.

The one or more processors may generate a first accumulative multiplication result by performing the accumulative multiplication based on the first ciphertext, and generate the target ciphertext by performing the key switching on the first accumulative multiplication result.

In another general aspect, a homomorphic encryption operation apparatus includes one or more processors, and storage storing instructions configured to, when executed by the one or more processors, cause the one or more processors to receive a blind rotation key for performing a blind rotation operation and an operand ciphertext of the blind rotation operation extract a common variable based on the operand ciphertext and the blind rotation key and generate a target ciphertext by performing accumulative multiplication and key switching based on the common variable.

A Hamming weight of a secret key is used to generate the blind rotation key.

The operand ciphertext may be a learning with error (LWE) ciphertext, and the target ciphertext may be a ring learning with error (RLWE) ciphertext.

The one or more processors may extract the common variable using some components of the blind rotation key.

The one or more processors may generate a second accumulative multiplication result by performing the accumulative multiplication based on the common variable, generate a key-switched second accumulative multiplication result by performing the key switching on the second accumulative multiplication result, and generate the target ciphertext by performing multiplication of the key-switched second accumulative multiplication result by some terms of polynomials constituting the blind rotation key.

The one or more processors may generate a third accumulative multiplication result by performing the accumulative multiplication based on the common variable, generate a variable-changed multiplication result by changing a variable of a polynomial representation constituting the third accumulative multiplication result, generate a key-switched multiplication result by performing the key switching on the variable-changed multiplication result, and generate the target ciphertext by performing multiplication of the key-switched multiplication result by some terms of polynomials constituting the blind rotation key.

The one or more processors may generate a fourth accumulative multiplication result by performing the accumulative multiplication based on the common variable, generate a multiplication result by performing multiplication of the fourth accumulative multiplication result by some terms of polynomials constituting the blind rotation key, generate a variable-changed multiplication result by changing a variable of a polynomial representation constituting the multiplication result, and generate the target ciphertext by performing the key switching on the variable-changed multiplication result.

The one or more processors may generate the fourth accumulative multiplication result by performing the accumulative multiplication of the common variable by an accumulative value corresponding to a variable corresponding to a power of 5 or −5 among variables of the blind rotation key.

The one or more processors may generate a first key switching result by performing first key switching based on the common variable, and generate the target ciphertext by performing the accumulative multiplication and second key switching based on the first key switching result.

In another general aspect, a homomorphic encryption operation method includes receiving a blind rotation key for performing a blind rotation operation and an operand ciphertext of the blind rotation operation, generating a first ciphertext by performing addition of a polynomial representation based on the blind rotation key and the operand ciphertext, and generate a target ciphertext by performing key switching and accumulative multiplication based on the first ciphertext.

The generating of the first ciphertext may include generating the first ciphertext based on a variable of a polynomial representation constituting the blind rotation key and an index corresponding to an odd exponent of the variable.

The generating of the target ciphertext may include generating a key-switched ciphertext by performing the key switching on the first ciphertext, and generating the target ciphertext by performing the accumulative multiplication based on the key-switched ciphertext.

The generating of the target ciphertext may include generating a first accumulative multiplication result by performing the accumulative multiplication based on the first ciphertext, and generating the target ciphertext by performing the key switching on the first accumulative multiplication result.

Other features and aspects will be apparent from the following detailed description, the drawings, and the claims.

Figure 1:
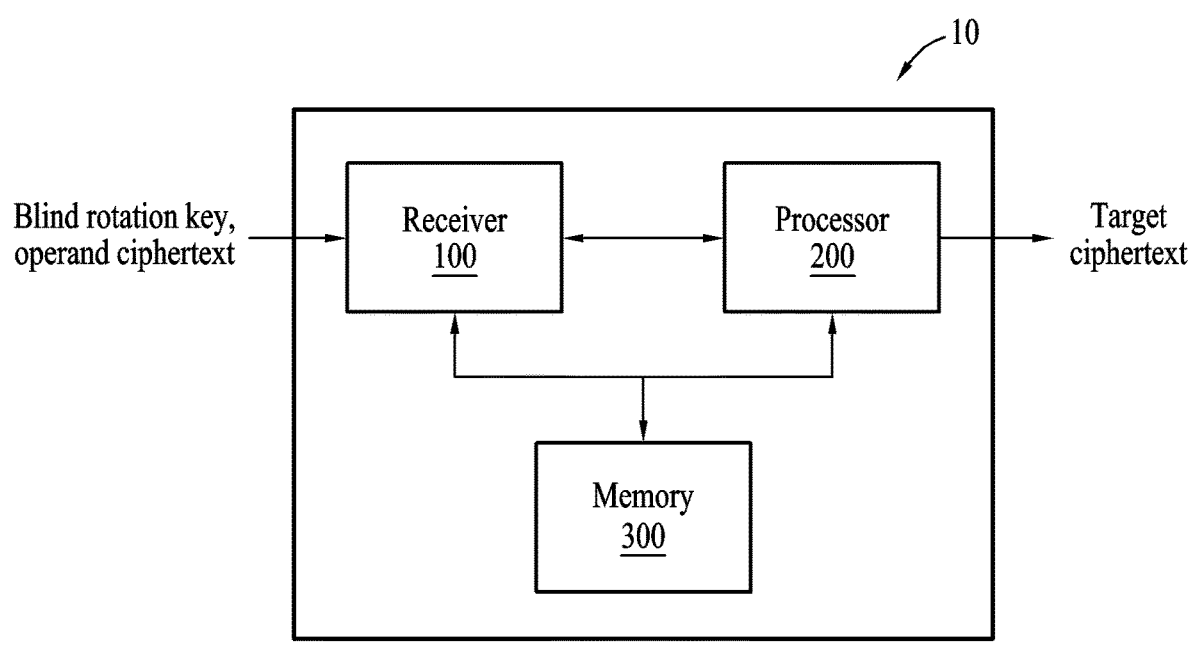
FIG. 1 illustrates an example of a homomorphic encryption operation apparatus, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of a homomorphic encryption operation apparatus, according to one or more embodiments.

Referring to FIG. 1, a homomorphic encryption operation apparatus 10 may perform encryption and decryption using homomorphic encryption. The homomorphic encryption operation apparatus 10 may perform a blind rotation operation for a homomorphic encryption operation.

The homomorphic encryption operation apparatus 10 may generate a blind rotation key for performing the blind rotation operation. The homomorphic encryption operation apparatus 10 may perform the blind rotation operation using the blind rotation key.

Homomorphic encryption schemes allow various operations to be performed on encrypted data while preserving the decryptability of the underlying cleartext. In homomorphic encryption, a result of an operation on a first ciphertext may become a new ciphertext, and a plaintext obtained by decrypting the new ciphertext may be the same as if the operation had been performed on the plaintext in the first ciphertext.

Hereinafter, encrypted data or encrypted text may be referred to as a ciphertext. The ciphertext may be in the form of a polynomial or a vector including a polynomial. Typically, the ciphertext will be a vector of numbers that, by convention, are coefficients of terms of a polynomial.

The homomorphic encryption operation apparatus 10 may perform a ring learning with errors (RLWE) problem-based homomorphic encryption operation that supports an operation on a ciphertext into which a plaintext is encrypted. The plaintext may be in the form of binary number, an integer, a rea number, and/or a complex number, for example. In some implementations the plaintext may be an integer encoding of any general text message.

The homomorphic encryption operation apparatus 10 may derive the same result as one obtained from an operation performed on the data of a plaintext by decrypting a result obtained from an operation on the data in an encrypted state using homomorphic encryption. In other words, for a homomorphic operation O( ) where ciphertext C is a homomorphic encryption of plaintext P, decryption(O(C))=O(P).

The homomorphic encryption operation apparatus 10 may perform an operation on a ciphertext which may involve a lookup table (LUT) operation and key generation. The homomorphic encryption operation apparatus 10 may perform an operation on a non-polynomial function using the blind rotation method in homomorphic encryption.

The homomorphic encryption operation apparatus 10 may perform an encryption process of encrypting input data in privacy-preserving machine learning (PPML) and application services. The homomorphic encryption operation apparatus 10 may be applied to application services requiring high accuracy, since an error does not significantly increase after performing modulus refresh.

The homomorphic encryption operation apparatus 10 may be implemented in the form of a chip and mounted on (or as) a hardware accelerator that utilizes homomorphic encryption. The homomorphic encryption operation apparatus 10 may be implemented in the form of a chip or software to reduce memory usage. The homomorphic encryption operation apparatus 10 may reduce a computational amount used to perform homomorphic encryption operations and may thereby reduce a total computational load of a server.

The homomorphic encryption operation apparatus 10 may be implemented in a personal computer (PC), a data server, or a portable device, for example.

A portable device may be implemented as, for example, a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal or portable navigation device (PND), a handheld game console, an e-book, or a smart device. A smart device may be implemented as, for example, a smartwatch, a smart band, or a smart ring.

The homomorphic encryption operation apparatus 10 may include a receiver 100 and a processor 200. The homomorphic encryption operation apparatus 10 may further include a memory 300.

The receiver 100 may include a receiving interface. The receiver 100 may receive a blind rotation key for performing a blind rotation operation and an operand ciphertext that is an operand of the blind rotation operation. The operand ciphertext may be a learning with error (LWE) ciphertext. The receiver 100 may output the blind rotation key and the operand ciphertext to the processor 200.

The processor 200 may process data stored in the memory 300. The processor 200 may execute a computer-readable code (e.g., software in the form of instructions) stored in the memory 300 and instructions triggered by the processor 200.

The processor 200 may be a data processing device embodied by hardware having a circuit of a physical structure to execute desired operations. The desired operations may include, for example, codes or instructions included in a program.

The hardware-implemented data processing device may include, for example, a microprocessor, a central processing unit (CPU), a processor core, a multi-core processor, a multiprocessor, an application-specific integrated circuit (ASIC), and/or a field-programmable gate array (FPGA).

The processor 200 may generate a temporary ciphertext by performing addition of a polynomial based on the blind rotation key and the operand ciphertext. The processor 200 may generate the temporary ciphertext based on a variable of a polynomial constituting the blind rotation key and based on an index corresponding to an odd exponent of the variable. The process of generating the temporary ciphertext is described with reference to FIG. 3.

The processor 200 may generate a key-switched ciphertext by performing key switching on the temporary ciphertext.

The processor 200 may generate a target ciphertext by performing key switching and accumulative multiplication based on the temporary ciphertext. The target ciphertext may be an RLWE ciphertext.

A Hamming weight of a secret key used to generate a blind rotation key may be a natural number smaller than a predefined number.

The processor 200 may generate a target ciphertext in the form of an RLWE ciphertext by performing accumulative multiplication based on an RLWE ciphertext based on a secret key of an operand ciphertext and a key-switched ciphertext.

The processor 200 may generate the target ciphertext by performing the accumulative multiplication based on the key-switched ciphertext. The processor 200 may generate a first accumulative multiplication result by performing the accumulative multiplication based on the temporary ciphertext. The processor 200 may generate the target ciphertext by performing key switching on the first accumulative multiplication result. The key switching operation is described with reference to FIG. 3. A first accumulative multiplication operation is described with reference to FIG. 4.

The processor 200 may extract a common variable based on the operand ciphertext and the blind rotation key. The processor 200 may generate the target ciphertext by performing the accumulative multiplication and the key switching based on the common variable.

The processor 200 may extract the common variable by using some components of the blind rotation key. Hereinafter, the process of extracting the common variable is described with reference to FIG. 5.

The processor 200 may generate a second accumulative multiplication result by performing the accumulative multiplication based on the common variable. The processor 200 may generate a key-switched second accumulative multiplication result by performing the key switching on the second accumulative multiplication result. The processor 200 may generate the target ciphertext by performing the multiplication of the key-switched second accumulative multiplication result by some terms of polynomials constituting the blind rotation key. A second accumulative multiplication operation is described with reference to FIG. 6.

The processor 200 may generate a third accumulative multiplication result by performing the accumulative multiplication based on the common variable. The process of generating the third accumulative multiplication result is described with reference to FIG. 7.

The processor 200 may generate a variable-changed multiplication result by changing a variable of a polynomial constituting the third accumulative multiplication result. The processor 200 may generate a key-switched multiplication result by performing the key switching on the variable-changed multiplication result. The processor 200 may generate the target ciphertext by performing the multiplication of the key-switched multiplication result and some terms of polynomials constituting the blind rotation key.

The processor 200 may generate a fourth accumulative multiplication result by performing the accumulative multiplication based on the common variable. The processor 200 may generate the fourth accumulative multiplication result by performing the accumulative multiplication of the common variable by an accumulative value corresponding to a variable corresponding to a power of 5 or −5 among variables of the blind rotation key. The process of generating the fourth accumulative multiplication result is described with reference to FIG. 8.

The processor 200 may generate a multiplication result by performing the multiplication of the fourth accumulative multiplication result by some terms of polynomials constituting the blind rotation key. The processor 200 may generate a variable-changed multiplication result by changing a variable of a polynomial constituting the multiplication result. The processor 200 may generate the target ciphertext by performing the key switching on the variable-changed multiplication result.

The processor 200 may generate a first key switching result by performing first key switching based on the common variable. The processor 200 may generate the target ciphertext by performing the accumulative multiplication and second key switching based on the first key switching result.

The memory 300 may store instructions (or programs/code) executable by the processor 200. For example, the instructions include instructions for performing the operation of the processor 200 and/or an operation of each component of the processor 200.

The memory 300 may be embodied as a volatile and/or non-volatile memory device.

A volatile memory device may be implemented, for example, as a dynamic random access memory (DRAM), a static random access memory (SRAM), a thyristor RAM (T-RAM), a zero capacitor RAM (Z-RAM), or a twin transistor RAM (TTRAM).

A non-volatile memory device may be implemented, for example, as an electrically erasable programmable read-only memory (EEPROM), a flash memory, a magnetic RAM (MRAM), a spin-transfer torque-MRAM (STT-MRAM), a conductive bridging RAM (CBRAM), a ferroelectric RAM (FeRAM), a phase change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

Figure 2:
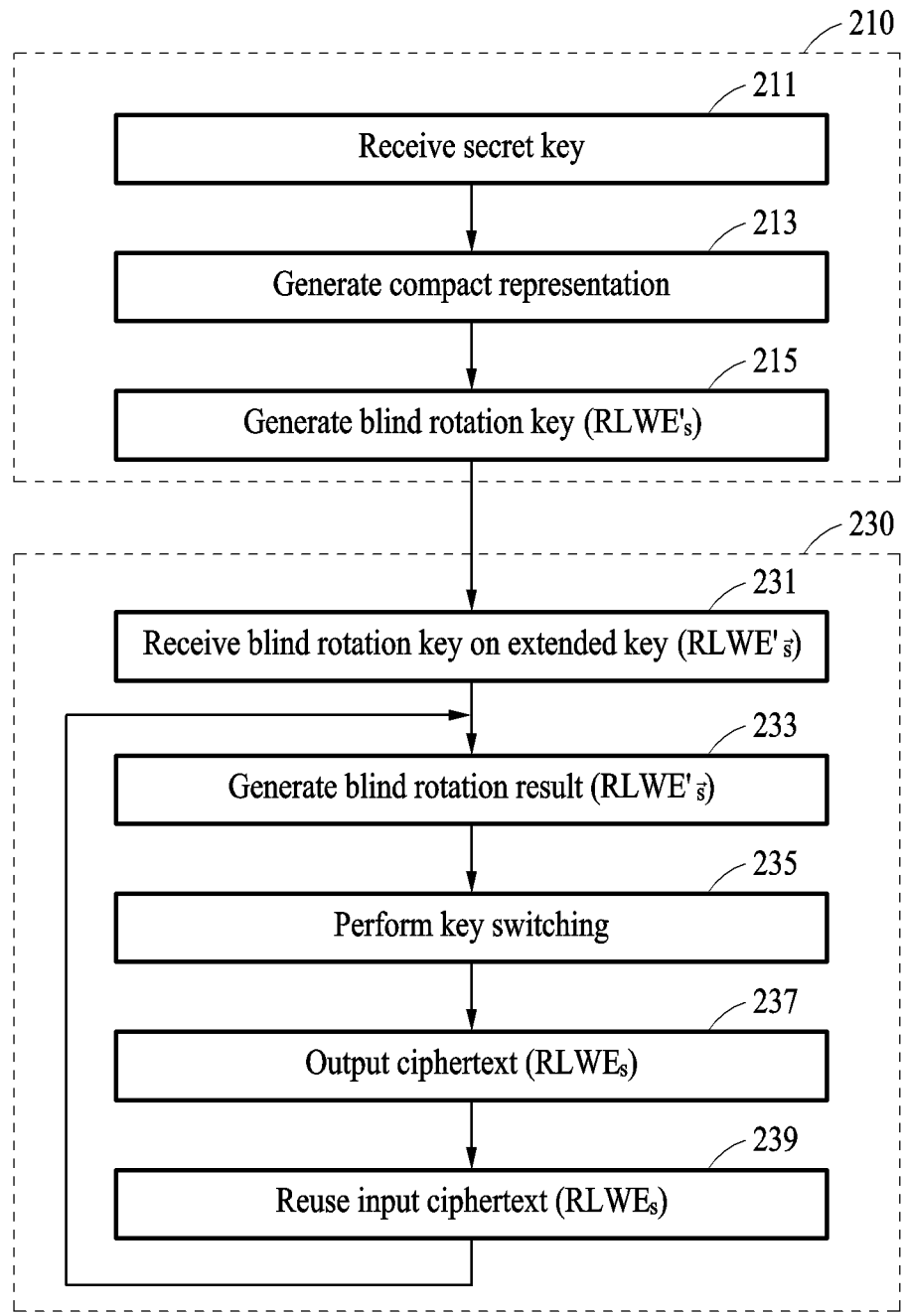
FIG. 2 illustrates an example process of a homomorphic encryption operation, according to one or more embodiments.

FIG. 2 illustrates an example process of the homomorphic encryption operation apparatus illustrated in FIG. 1.

Referring to FIG. 2, when the secret key is sparse, a processor (e.g., the processor 200 of FIG. 1) may reduce a computational load and memory required in the blind rotation operation (e.g., the memory 300 of FIG. 1).

When coefficients of a polynomial constituting an N-th secret key are in the set $\{-1, 0, 1\}$ and the Hamming weight h is less than N, the secret key may be considered sparse. In this example, N and h are arbitrary natural numbers and may be set according to implementation.

In a case where the secret key is sparse, when the processor 200 generates N*h ciphertexts, in which a public key used in the blind rotation operation is set as only an index with a Hamming weight contribution of 1 or −1, the size of the public key may increase h times compared to the related art, but the computational amount required for the blind rotation operation may be reduced by h/N times. However, a process of reconstructing the public key may be additionally required.

The ciphertext used by the processor 200 for the homomorphic encryption operation may be defined as follows.

An RLWE ciphertext of a message m for a secret key s may be defined as Equation 1, and may be expressed as $RLWE_s(m)$. The message may be a plaintext.

$$RLWE(m) = (a, a \cdot s + e + m) \qquad \text{Equation 1}$$

Herein, a represents a polynomial with a coefficient on a modulus q, and e represents an error polynomial with a small coefficient. The processor 200 may randomly generate a and e for each encryption.

For example, when a ciphertext, $(a, b) \in R_q^2$ is the input, the decryption process for ciphertext $(a, b) \in R_q^2$ may be $a \cdot s + b = m + e \pmod{q}$. For real numbers, the decryption process may be expressed as $a \cdot s + b = m + e + q \cdot v$.

An RLWE' ciphertext of the message m for the secret key s may be defined as Equation 2.

$$\text{RLWE}'(m) = (\text{RLWE}(g_0 \cdot m), \text{RLWE}(g_1 \cdot m), \ldots, \text{RLWE}(g_{d-1} \cdot m)) \quad \text{Equation 2}$$

Here, $(g_0, g_1, g_{d-1})$ may be a vector defined in advance for decomposing an arbitrary integer, and may be set in the form of $(1, B, B^2, \ldots, B^{d-1})$ for an arbitrary integer B or in the form of $(\overline{Q}_0 \cdot [\overline{Q}_0^{-1}]_{q_0}, \ldots, \overline{Q}_{d-1} \cdot [\overline{Q}_{d-1}^{-1}]_{q_{d-1}})$ for $\overline{Q}_i = Q/q_i$.

The RGSW ciphertext of the message m for the secret key s may be defined as Equation 3.

$$\text{RSGW}(m) = \text{RLWE}'(-sm), \text{RLWE}'(m)) \quad \text{Equation 3}$$

The blind rotation operation (or the homomorphic blind rotation operation) may be defined as follows. When $(a_3, b_3) \in R_Q^2$ is obtained by performing the blind rotation operation for $f(X) = -\Sum_{i=-c}^{c} iq \cdot X^i$ on a ciphertext $\text{RLWE}_s(u) \in R_{2N}^2$, the blind rotation operation be an operation in which a ciphertext $(a_3, b_3) \in R_Q^2$ satisfies $a_3 \cdot s + b_3 = -u \cdot q' + e_3 \pmod{Q}$.

An LWE extraction (ExtractLWE) operation may refer to an operation of extracting coefficients of $a = a_0 + a_1 X + \ldots + a_{N-1} X^{N-1}$ and $b = b_0 + b_1 X + \ldots + b_{N-1} X^{N-1}$ in the form of $(\vec{a}_i = (a_i, a_{i-1}, \ldots, a_0, -a_{N-1}, -a_{N-2}, \ldots -a_{i+1}), b_i)$. And, $a_2 \cdot s + b_2 = -u + 2N \cdot v$ may satisfy $a_2 \cdot s + b_2 = -u \pmod{2N}$ on modulus 2N. Here, coefficients of $u = u_0 + u_1 X + \ldots + u_{N-1} X^{N-1}$ may be expressed as coefficients of two ciphertext polynomials $a_2 = a_0 + a_1 X + \ldots + a_{N-1} X^{N-1}$ and $b_2 = b_0 + b_1 X + \ldots + b_{N-1} X^{N-1}$.

For example, in a case where $\vec{s} = (s_0, s_1, \ldots, s_{N-1})$ is set as a coefficient vector of s, when coefficients are extracted from $a_2$ and defined as $\vec{a}_i = (a_i, a_{i-1}, \ldots, a_0, -a_{N-1}, -a_{N-1}, \ldots -a_{i+1})$, Equation 4 may be satisfied for all $i \in \{0, \ldots N-1\}$.

$$\vec{a}_i \cdot \vec{s} + b_i = -u_i \pmod{2N} \quad \text{Equation 4}$$

The processor 200 may generate a public key in the form of $\text{RLWE}'(\Sigma \delta_{i,j} X^j)$. The processor 200 may perform the key switching operation having a relatively large computational amount in a process of reconstructing $\text{RLWE}'(\delta_{i,j})$ for each j from $\text{RLWE}'(\Sigma \delta_{i,j} X^j)$. The processor 200 may reduce computation by changing the order of the key switching operation. In some implementations, the processor 200 may be able to perform all operations using a memory having a constant size by using an algebraic relationship between ciphertexts before performing the key switching operation (i.e., memory usage may be limited to a constant size).

The processor 200 may reduce the amount of computational while obtaining the same operation result by performing the key switching on the RLWE ciphertext, rather than on the RLWE' ciphertext. Since the RLWE' ciphertext may consist of a plurality of RLWE ciphertexts (e.g., d RLWE ciphertexts, where d is a natural number), the operation on the RLWE ciphertext may be d times faster than the operation on the RLWE' ciphertext and may have low memory consumption.

The processor 200 may perform a coefficient permutation operation on RLWE instead of RLWE' by adjusting the type or order of the key switching operation and the coefficient permutation operation. The processor 200 may reduce the computational amount by allowing the RLWE' portion to maintain the same value each time the operation R⊙RLWE' is performed (which may be performed multiple times). The processor 200 may simplify the configuration of the homomorphic encryption operation apparatus 10 through reuse without conversion of the RLWE' portion.

The processor 200 may perform (i) a compact representation process of storing RGSW ciphertexts in a small number of RLWE' ciphertexts, (ii) the blind rotation operation from the RLWE' ciphertexts, and (iii) key switching on the RLWE ciphertext which is an output value.

In the example of FIG. 2, the processor 200 may include a key generator 210 and an operator 230. The key generator 210 and the operator 230 may be implemented on different hardware. In operation 211, the key generator 210 may receive a secret key s as an input. In operation 213, the key generator 210 may generate a compact representation (a ciphertext having a compact structure) based on the secret key. In operation 215, the key generator 210 may generate a blind rotation key for performing the blind rotation operation on the compact representation. The blind rotation key may perform packing of $(\delta_{i,j})$ for each coefficient of a polynomial and generate the RLWE' ciphertext for one polynomial, thereby reducing the size of the public key.

The key generator 210 may output the generated blind rotation key to the operator 230. Depending on the configuration, the key generator 210 may transmit the blind rotation key wirelessly or through a line to the operator 230.

The operator 230 may perform the blind rotation operation and output an RLWE ciphertext for f(m), where f( ) may be, for example, an encoding function. In operation 231, the operator 230 may receive an LWE or RLWE ciphertext for the message m as an input. The processor 200 may generate the RLWE' ciphertext for an extended secret key $\vec{s}$ based on the blind rotation key. The blind rotation key, which is the RLWE' ciphertext for the secret key s, may have, as a plaintext, a polynomial including a plurality of secret keys as coefficients. The blind rotation key, which is composed of the RLWE' ciphertext for the extended secret key $\vec{s}$ reconstructed by using the RLWE' ciphertext for the secret key s, may have a value corresponding to one integer value as a plaintext.

The extended secret key $\vec{s}$ may be a set or subset of all automorphisms for s.

To reduce memory usage and computation, the processor 200 may not actually generate the blind rotation key, which is the RLWE' ciphertext for the secret key s, but instead may calculate only a final operation result by using a relationship between the RLWE' ciphertext (corresponding to the extended secret key $\vec{s}$) and the RLWE' ciphertext (corresponding to the original secret key s).

In operation 233, the processor 200 may generate a blind rotation result. In operation 235, the processor 200 may perform the key switching operation. In operation 237, the processor 200 may output a ciphertext (e.g., the RLWE ciphertext) generated through the key switching. In operation 239, the processor 200 may use the output value as an input ciphertext.

Various examples of the homomorphic encryption operation are described with reference to FIGS. 3 to 8.

Figure 3:
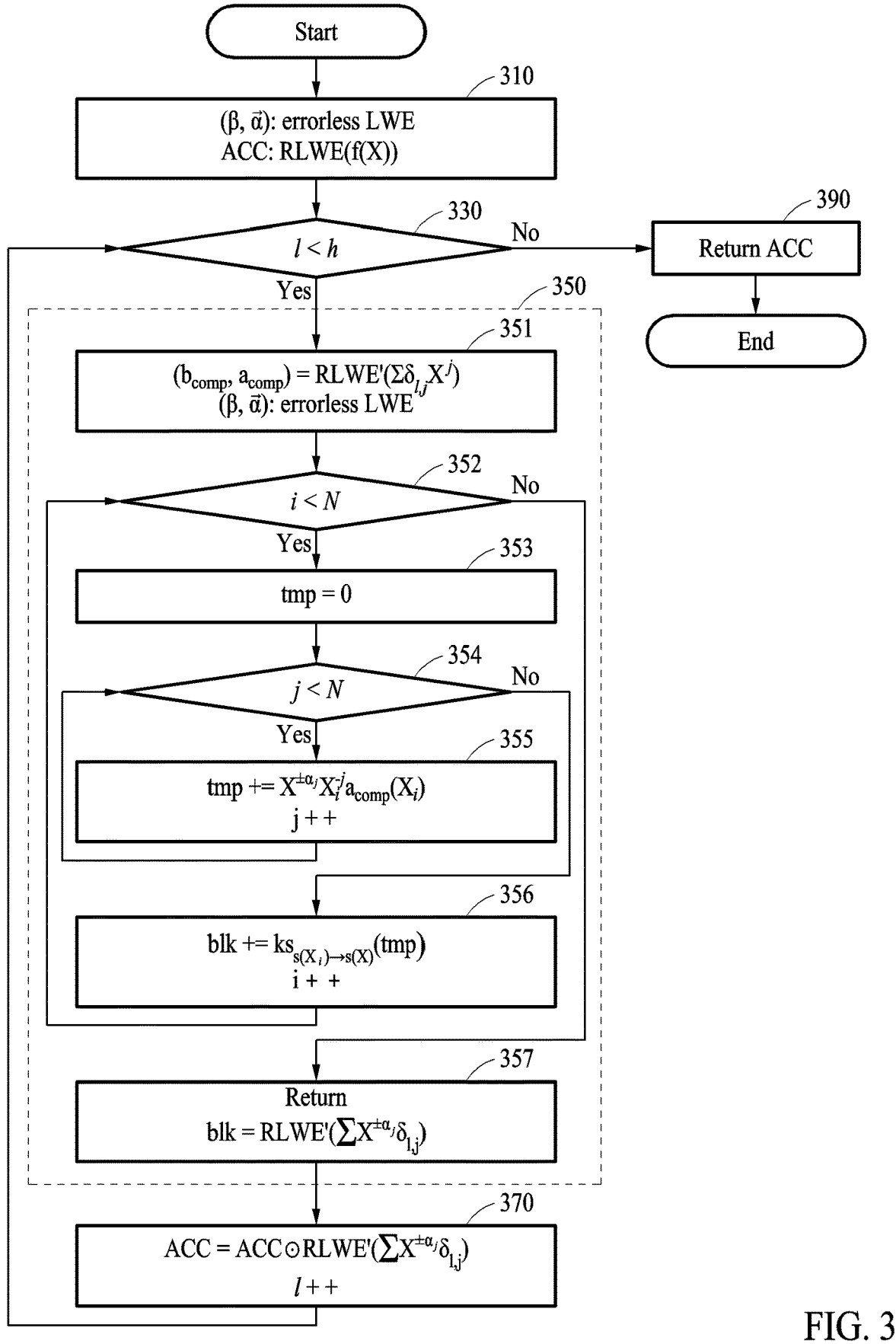
FIG. 3 illustrates an example of a homomorphic encryption operation, according to one or more embodiments.

FIG. 3 illustrates an example of a homomorphic encryption operation.

Referring to FIG. 3, in operation 310, a receiver (e.g., the receiver 100 of FIG. 1) may receive a blind rotation key and an operand ciphertext. For example, the ciphertext may include an errorless LWE. The processor (e.g., the processor 200 of FIG. 1) may assign RLWE(f(X)) to an ACC variable (a final/return variable).

In operation 330, the processor 200 may determine whether l is smaller than h for a loop operation (l and h are natural numbers). While l is smaller than h, the processor 200 may repeatedly perform operation 350 to compute ACC, otherwise, it may return the initial ACC of RLWE(f(X)).

In operation 351, the processor 200 may obtain a parameter for performing the blind rotation operation based on the received blind rotation key (e.g., the RLWE' ciphertext) and based on the operand ciphertext (e.g., the errorless LWE ciphertext).

In operation 352, the processor 200 may determine whether i is smaller than N (i and N are natural numbers). While i is smaller than N, the processor 200 may repeatedly perform operations 353 to 356. In operation 353, the processor 200 may assign 0 to tmp, which stores a temporary ciphertext.

In operation 354, the processor 200 may determine whether j is smaller than N (j is a natural number). While j is smaller than N, the processor 200 may repeatedly perform operation 355. In operation 355, the processor 200 may generate a temporary ciphertext by performing addition of a polynomial based on the blind rotation key and the operand ciphertext. The temporary ciphertext may be stored in tmp.

Regarding i=0, . . . , N−1, $X_i$ may be a set of all odd-exponent terms of X and the indexing may be arbitrarily performed. One of them may be defined as $$X_i = X^{\prod_l \left(\frac{N}{2^l}+1\right)^{i_l}}.$$

In this case, l=0, . . . , log N−1 is satisfied and $i_l$ may refer to an l-th bit when i is expressed in binary.

In operation 356, the processor 200 may perform the key switching based on the temporary ciphertext. In operation 357, the processor 200 may store and return the key-switched ciphertext in variable blk. In operation 370, the processor 200 may generate the target ciphertext by performing the accumulative multiplication on the key-switched ciphertext.

In a case where ACC=(b, a), when a⊙RLWE'=(b', a') is satisfied, the accumulative multiplication (or multiplication or alternative multiplication) of ACC by RLWE' may be defined as in Equation 5.

$$ACC \circledcirc RLWE' = a' \odot RLWE'(s^2) + (0, b') + b \odot RLWE' \quad \text{Equation 5}$$

In operation 390, when l is greater than or equal to h, the processor 200 may return the ACC value.

In the example of FIG. 3, by repeating operation 350, the processor 200 may return an RLWE' ciphertext blk=RLWE' ($\Sigma X^{\pm \alpha_i} \delta_{l,j}$), which is a linear combination of the blind rotation key by using, as inputs, ($b_{comp}$, $a_{comp}$)= RLWE'($\Sigma \delta_{l,j} X^j$), which is the blind rotation key, and the LWE ciphertext ($\beta$, $\vec{\alpha}$), which is the operand ciphertext.

The blind rotation key used as the input by the processor 200 may be transmitted from separate hardware, such as the key generator 210 of FIG. 2. The blind rotation key may be implemented as a compact blind rotation key.

The processor 200 may reconstruct a complete blind rotation key using automorphism of the RLWE' ciphertext based on the received compact blind rotation key.

The processor 200 may generate a linear combination of the blind rotation key by using the reconstructed complete blind rotation key and the input operand ciphertext. In the manner described above, the processor 200 may generate the same operation result as the blind rotation operation of the related art. The processor 200 may repeatedly perform the blind rotation operation by using the generated operation result.

In the example of FIG. 3, since it is not necessary to store the tmp value each time when the loop for i is performed, the required size of memory may be proportional to the size for storing one RLWE' ciphertext. In other words, the size of the memory required in the example of FIG. 3 may be O(1), which is a constant.

The processor 200 may reduce the computational amount and reduce the required amount of memory by performing the homomorphic encryption operation of FIG. 3. In the example of FIG. 3, the required amount of memory and the computational amount may be) respectively O(1) and O(dN).

Figure 4:
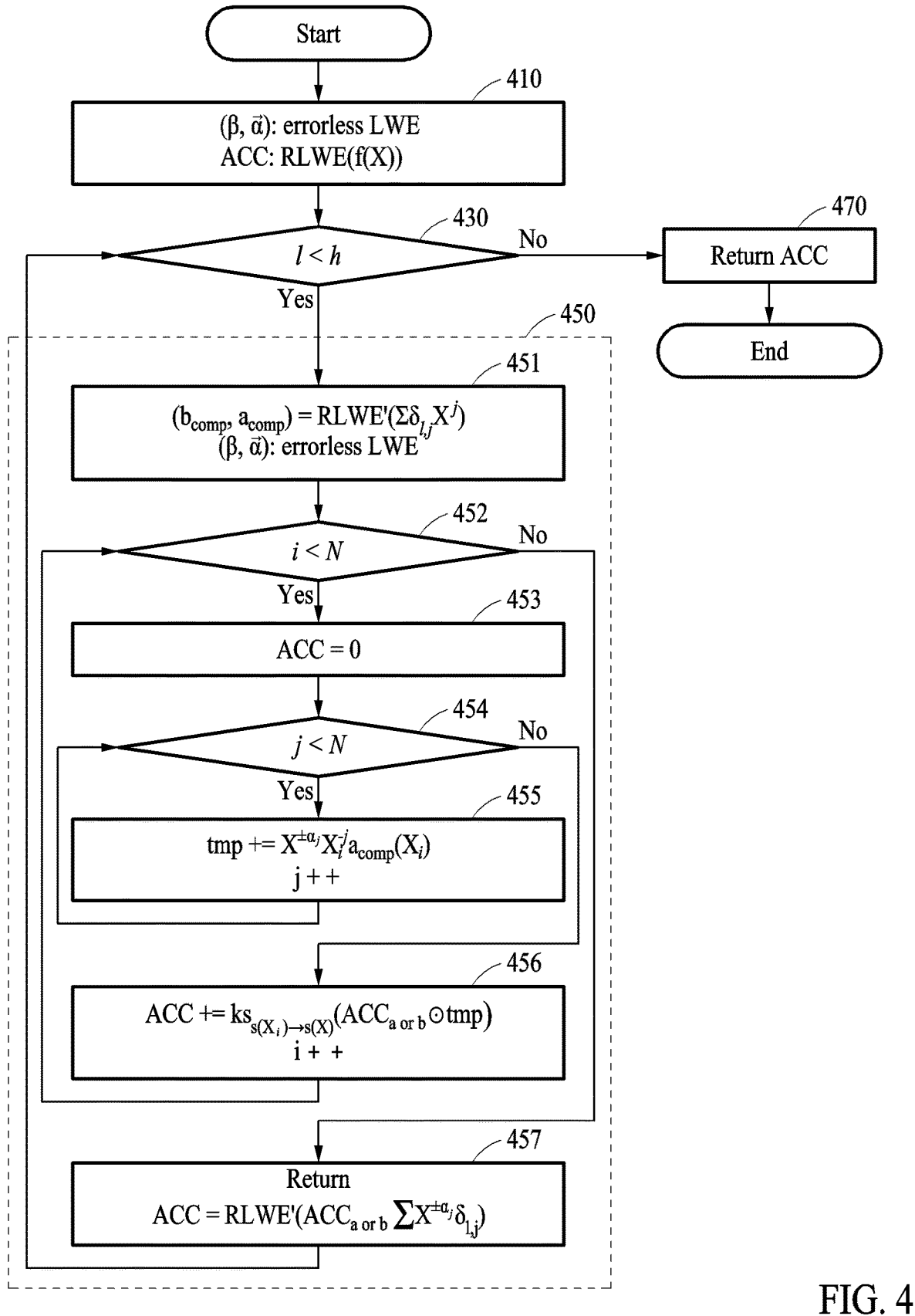
FIG. 4 illustrates another example of a homomorphic encryption operation, according to one or more embodiments.

FIG. 4 illustrates another example of a homomorphic encryption operation.

Referring to FIG. 4, in operation 410, a receiver (e.g., the receiver 100 of FIG. 1) may receive a blind rotation key and an operand ciphertext. For example, the ciphertext may be an errorless LWE ciphertext. A processor (e.g., the processor 200 of FIG. 1) may assign RLWE(f(X)) to an ACC variable.

In operation 430, the processor 200 may determine whether l is smaller than h for a loop operation (l and h are natural numbers). While l is smaller than h, the processor 200 may repeatedly perform operation 450.

In operation 451, the processor 200 may obtain a parameter for performing the blind rotation operation based on the received blind rotation key (e.g., the RLWE' ciphertext) and operand ciphertext (e.g., the errorless LWE ciphertext).

In operation 452, the processor 200 may determine whether i is smaller than N (i and N are natural numbers). While i is smaller than N, the processor 200 may repeatedly perform operations 453 to 456. In operation 453, the processor 200 may initially assign 0 to ACC, which is used to store an accumulative multiplication value.

In operation 454, the processor 200 may determine whether j is smaller than N (j is a natural number). While j is smaller than N, the processor 200 may repeatedly perform operation 455. In operation 455, the processor 200 may generate a temporary ciphertext by performing addition of a polynomial based on the blind rotation key and the operand ciphertext. The temporary ciphertext may be stored in tmp.

In operation 456, the processor 200 may generate a first accumulative multiplication result by performing the accumulative multiplication based on the temporary ciphertext. The accumulative multiplication may be performed using Equation 5. In operation 456, the processor 200 may perform the key switching on the first accumulative multiplication result.

In operation 456, the processor 200 may store a generated target ciphertext in the ACC. In operation 470, when l is greater than or equal to h, the processor 200 may return the ACC.

The example of FIG. 4 may show an example in which the order of multiplying the ACC is changed by applying the distributive property to the ACC. In other words, the example of FIG. 4 may be obtained by changing $ks_{s(X_j) \to s(x)}$(tmp) of the example of FIG. 3 to $ks_{s(X_j) \to s(x)}$ (ACC$_{a\ or\ b}$⊙tmp). Due to the above change, the processor 200 may reduce the number of times of the key switching operations from d(N−1) times to 2(N−1) times.

Since one RLWE' ciphertext is composed of d RLWE ciphertexts, it is necessary to perform the key switching on the d RLWE ciphertexts for the key switching on the one RLWE' ciphertext. Also, it is necessary to perform the key switching the number of times corresponding to the loop i=1, . . . , N−1, and accordingly, in the example of FIG. 3, the key switching may be performed d(N−1) times in total. The processor 200 may perform the key switching only 2(N−1) times by combining the key switching and the accumulative multiplication as $ks_{s(X_i) \to s(x)}(ACC_{a \text{ or } b} \odot tmp)$. 2 may be multiplied because the processor 200 performs the key switching for a and b, respectively.

Figure 5:
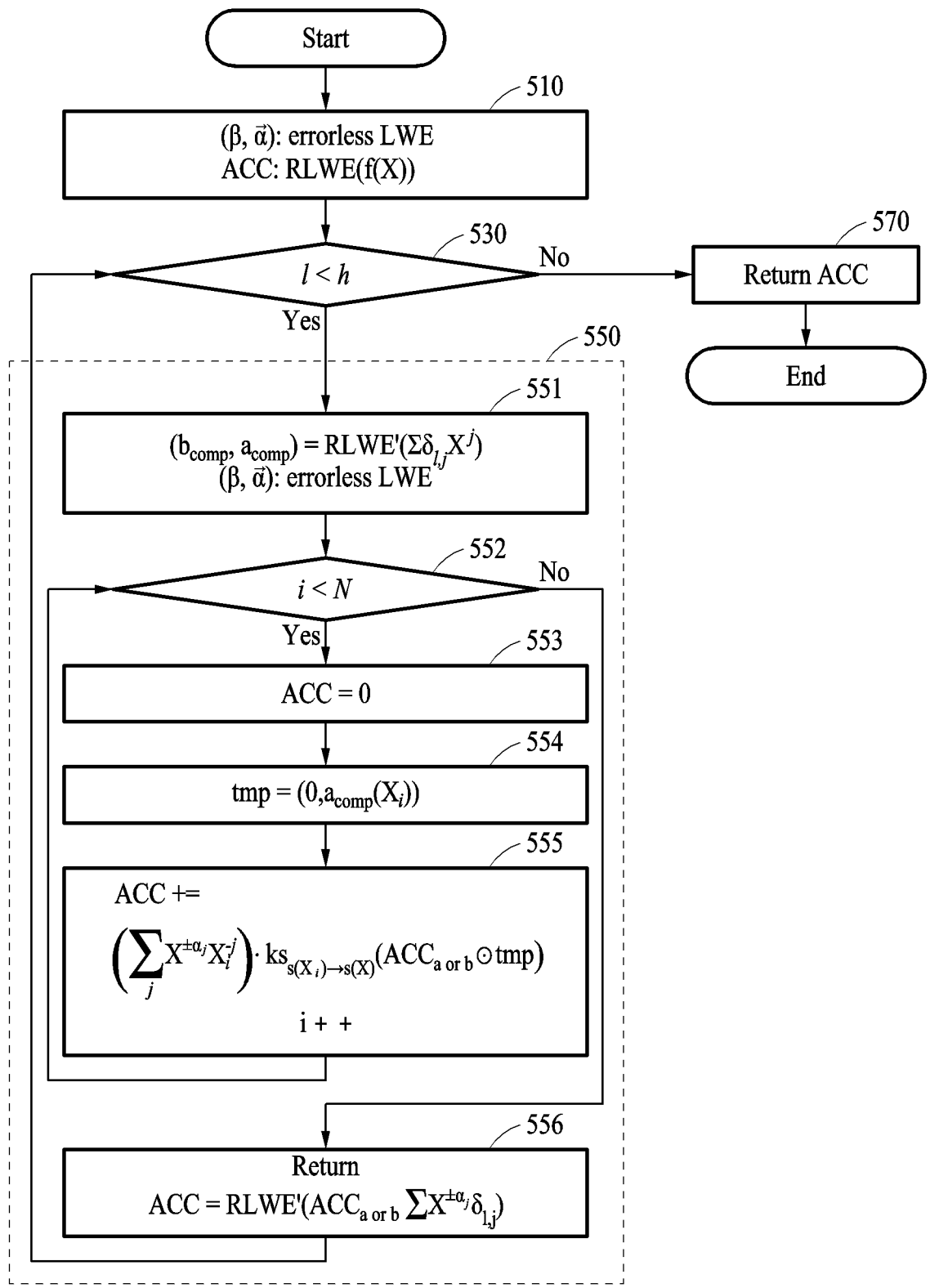
FIG. 5 illustrates still another example of a homomorphic encryption operation, according to one or more embodiments.

FIG. 5 illustrates still another example of a homomorphic encryption operation.

Referring to FIG. 5, in operation 510, a receiver (e.g., the receiver 100 of FIG. 1) may receive a blind rotation key and an operand ciphertext. For example, the ciphertext may include an errorless LWE. A processor (e.g., the processor 200 of FIG. 1) may assign RLWE(f(X)) to an ACC variable.

In operation 530, the processor 200 may determine whether l is smaller than h for a loop operation (l and h are natural numbers). While l is smaller than h, the processor 200 may repeatedly perform operation 550.

In operation 551, the processor 200 may obtain a parameter for performing the blind rotation operation based on the received blind rotation key (e.g., the RLWE' ciphertext) and operand ciphertext (e.g., the errorless LWE ciphertext).

In operation 552, the processor 200 may determine whether i is smaller than N (i and N are natural numbers). While i is smaller than N, the processor 200 may repeatedly perform operations 553 to 555.

In operation 553, the processor 200 may assign 0 to the ACC to store an accumulative multiplication value. The processor 200 may extract a common variable based on the operand ciphertext and the blind rotation key. In operation 554, the processor 200 may assign $(0, a_{comp}(X_i))$ to a temporary ciphertext tmp. The processor 200 may extract a common variable based on the operand ciphertext and the blind rotation key. For example, a common variable may be $(0, a_{comp}(X_i))$.

In operation 555, the processor 200 may perform the accumulative multiplication and the key switching based on the common variable. The processor 200 may generate a second accumulative multiplication result by performing the accumulative multiplication based on the common variable. The second accumulative multiplication result may be calculated as $ACC_{a \text{ or } b} \odot tmp$. The accumulative multiplication may be performed using Equation 5.

The processor 200 may generate a key-switched second accumulative multiplication result by performing the key switching on the second accumulative multiplication result. The key-switched second accumulative multiplication result may be $ks_{s(X_i) \to s(x)}(ACC_{a \text{ or } b} \odot tmp)$.

The processor 200 may perform the multiplication of the key-switched second accumulative multiplication result by some terms of polynomials constituting the blind rotation key, which may be performed as $$\left(\sum_j X^{\pm \alpha_j} X_i^{-j}\right) \cdot ks_{s(X_i) \to s(X)}(ACC_{a \text{ or } b} \odot tmp).$$

The processor 200 may separate $a_{comp}(X_i)$, which is a common portion, from the loop for performing tmp+=$X^{\pm \alpha_j} X_i^{-j}$ in the example of FIG. 4 using the common variable, and convert the operation to multiply $X^{\pm \alpha_j} X_i^{-j}$ by RLWE instead of multiplying by RLWE', by possible due to the commutative property of the operation. Through the conversion, the processor 200 may perform the homomorphic encryption operation of FIG. 4 (and output the same result) but with only N multiplications instead of dN multiplications.

In the example of FIG. 5, since the multiplication of $X^{\pm \alpha_j} X_i^{-j}$ is performed in the latest stage, amplification of an error may be reduced. Error amplification may be reduced because an error, which is amplified when the accumulative multiplication of R⊙RLWE' is performed, is an error included in the RLWE' and the operation $(\Sigma_j X^{\pm \alpha_j} X_i^{-j}) a_{comp}(X_i)$ has an error which is N times greater than $a_{comp}(X_i)$.

In operation 556, the processor 200 may store a generated target ciphertext in ACC. In operation 570, when l is greater than or equal to h, the processor 200 may return ACC.

Figure 6:
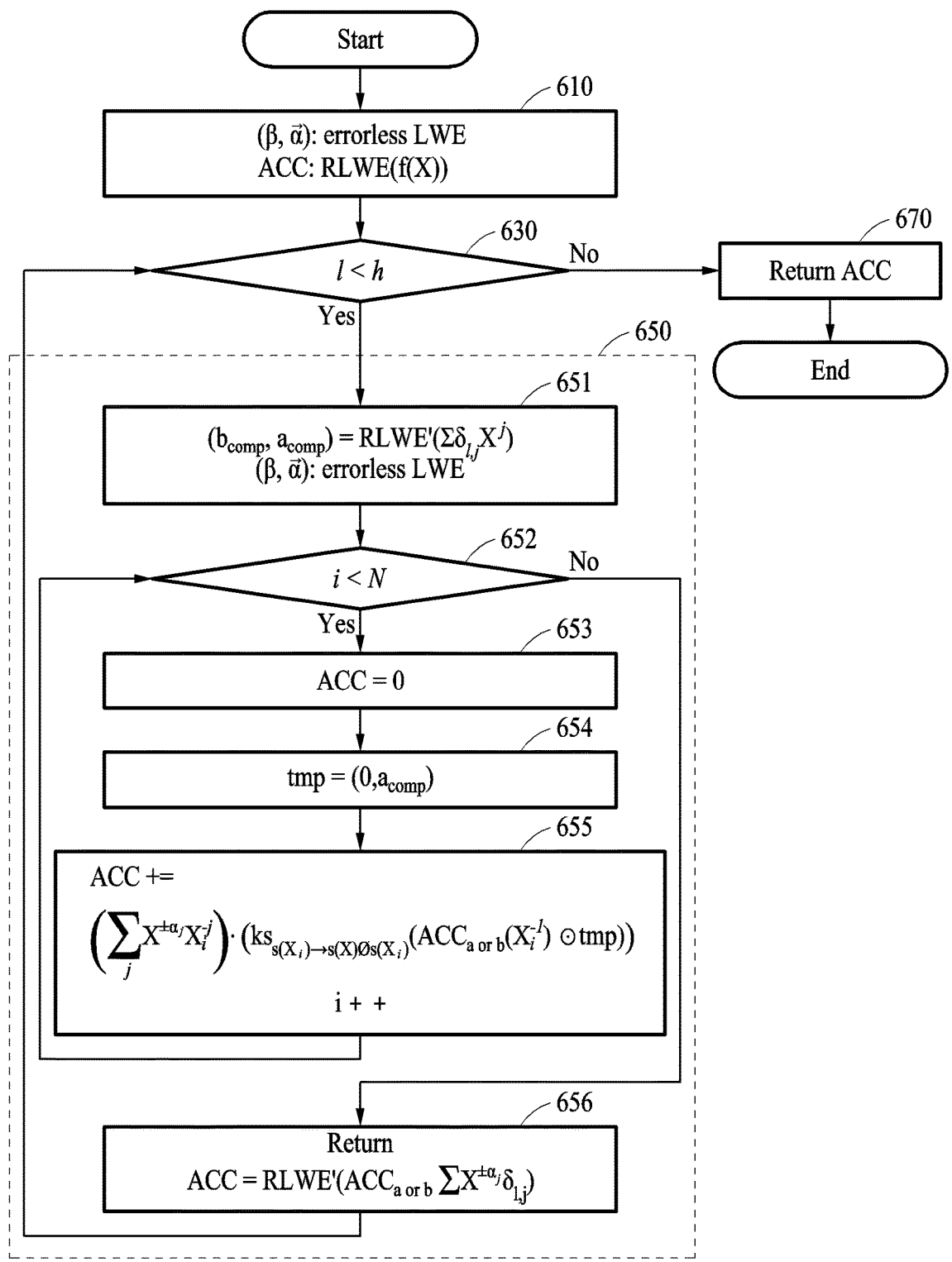
FIG. 6 illustrates still another example of a homomorphic encryption operation, according to one or more embodiments.

FIG. 6 illustrates still another example of a homomorphic encryption operation.

Referring to FIG. 6, in operation 610, a receiver (e.g., the receiver 100 of FIG. 1) may receive a blind rotation key and an operand ciphertext. For example, the ciphertext may include an errorless LWE. A processor (e.g., the processor 200 of FIG. 1) may assign RLWE(f(X)) to an ACC variable.

In operation 630, the processor 200 may determine whether l is smaller than h for a loop operation (l and h are natural numbers). While l is smaller than h, the processor 200 may repeatedly perform operation 650.

In operation 651, the processor 200 may obtain a parameter for performing the blind rotation operation based on the received blind rotation key (e.g., the RLWE' ciphertext) and operand ciphertext (e.g., the errorless LWE ciphertext).

In operation 652, the processor 200 may determine whether i is smaller than N (i and N are natural numbers). While i is smaller than N, the processor 200 may repeatedly perform operations 653 to 655.

In operation 653, the processor 200 may assign 0 to the ACC to store an accumulative multiplication value. The processor 200 may extract a common variable based on the operand ciphertext and the blind rotation key. In operation 654, the processor 200 may assign $(0, a_{comp})$ to a temporary ciphertext tmp. The processor 200 may extract a common variable based on the operand ciphertext and the blind rotation key. For example, a common variable may be $(0, a_{comp})$.

In operation 655, the processor 200 may generate the target ciphertext by performing the accumulative multiplication and the key switching based on the common variable. The processor 200 may generate a third accumulative multiplication result by performing the accumulative multiplication based on the common variable. The third accumulative multiplication result may be calculated as $(ACC_{a \text{ or } b}(X_i^{-1}) \odot tmp)$. The accumulative multiplication may be performed using Equation 5.

The processor 200 may generate a variable-changed multiplication result by changing a variable of a polynomial constituting the third accumulative multiplication result. The variable-changed multiplication result may be calculated as $\varnothing s(X_i)(ACC_{a \text{ or } b}(X_i^{-1}) \odot tmp)$.

The processor 200 may generate a key-switched multiplication result by performing the key switching on the variable-changed multiplication result. The key-switched multiplication result may be calculated as $$ks_{s(X_i) \to s(X) \odot s(X_i)}(ACC_{a \text{ or } b}(X_i^{-1}) \odot tmp).$$

The processor 200 may perform the multiplication of the key-switched multiplication result by some terms of polynomials constituting the blind rotation key, which may be calculated as $$\left(\sum_j X^{\pm a_j} X_i^{-j}\right) \cdot \left(ks_{s(X_i) \to s(X)\phi s(X_i)}(ACC_{a \text{ or } b}(X_i^{-1}) \odot tmp)\right).$$

The processor 200 may use tmp=(0, $a_{comp}$) as the common variable instead of tmp=(0, $a_{comp}(X_i)$) of the example of FIG. 5. The processor 200, in the example of FIG. 6, may use $a_{comp}$ without any change and may reduce the number of times of the automorphism from dN times to 2N times by applying the key switching on a value $$ks_{s(X_i) \to s(X)\phi s(X_i)}(ACC_{a \text{ or } b}(X_i^{-1}) \odot tmp).$$

The automorphism may be expressed by permutation of coefficients of a polynomial. Since one polynomial has N coefficients, a corresponding time complexity may be O(N). To calculate $a_{comp}(X_i)$, the automorphism is performed on each of d polynomials of $a_{comp}$, and the processor 200 may perform the automorphism for RLWE only once in the example of FIG. 6. Through this, the processor 200 may reduce the computation time from $O(dN^2)$ to $O(N^2)$.

In operation 656, the processor 200 may store a generated target ciphertext in ACC. In operation 670, when l is greater than or equal to h, the processor 200 may return ACC.

Figure 7:
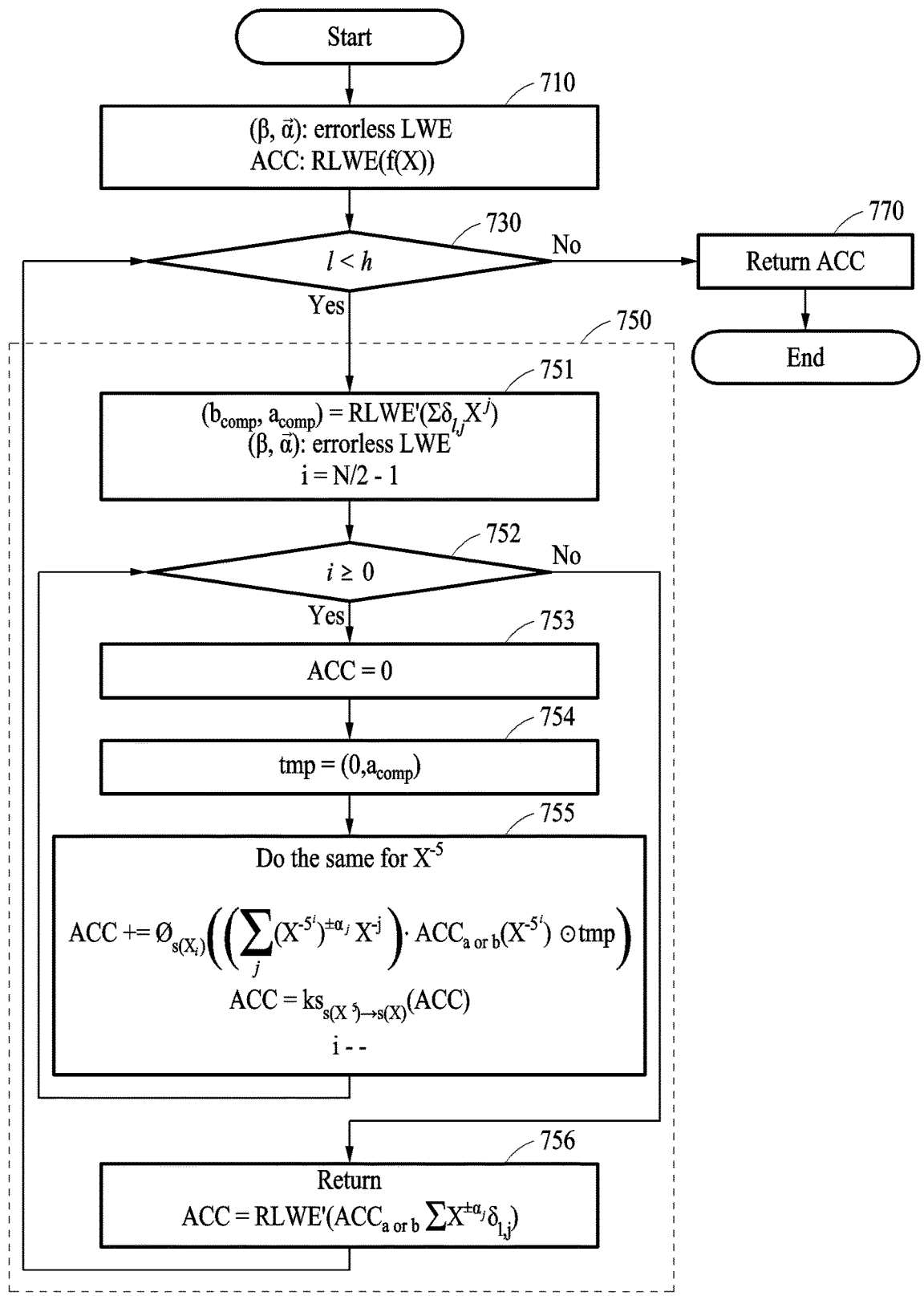
FIG. 7 illustrates still another example of a homomorphic encryption operation, according to one or more embodiments.

FIG. 7 illustrates still another example of a homomorphic encryption operation.

Referring to FIG. 7, in operation 710, a receiver (e.g., the receiver 100 of FIG. 1) may receive a blind rotation key and an operand ciphertext. For example, the ciphertext may be an errorless LWE ciphertext. A processor (e.g., the processor 200 of FIG. 1) may assign RLWE(f(X)) to an ACC variable.

In operation 730, the processor 200 may determine whether l is smaller than h for a loop operation (l and h are natural numbers). When l is smaller than h, the processor 200 may repeatedly perform operation 750.

In operation 751, the processor 200 may obtain a parameter for performing the blind rotation operation based on the received blind rotation key (e.g., the RLWE' ciphertext) and operand ciphertext (e.g., the errorless LWE ciphertext). The processor 200 may replace i with N/2−1.

In operation 752, the processor 200 may determine whether i is greater than or equal to 0. While i is greater than or equal to 0, the processor 200 may repeatedly perform operations 753 to 755.

In operation 753, the processor 200 may assign 0 to the ACC. The processor 200 may extract a common variable based on the operand ciphertext and the blind rotation key. In operation 754, the processor 200 may assign (0, $a_{comp}$) to a temporary ciphertext tmp. The processor 200 may extract a common variable based on the operand ciphertext and the blind rotation key. For example, a common variable may be (0, $a_{comp}$).

In operation 755, the processor 200 may generate the target ciphertext by performing the accumulative multiplication and the key switching based on the common variable. The processor 200 may generate a fourth accumulative multiplication result by performing the accumulative multiplication based on the common variable. The processor 200 may generate the fourth accumulative multiplication result by performing the accumulative multiplication of the common variable by an accumulative value corresponding to a variable corresponding to a power of 5 or −5 among variables of the blind rotation key. The fourth accumulative multiplication result may be calculated as $ACC_{a \text{ or } b}(X^{-5^i}) \odot tmp$.

The processor 200 may generate a multiplication result by performing the multiplication of the fourth accumulative multiplication result by some terms of polynomials constituting the blind rotation key. The multiplication result may be calculated as $$\left(\sum_j \left(X^{-5^i}\right)^{\pm a_j} X^{-j}\right) \cdot ACC_{a \text{ or } b}\left(X^{-5^i}\right) \odot tmp.$$

The processor 200 may generate a variable-changed multiplication result by changing a variable of a polynomial constituting the multiplication result. The variable-changed multiplication result may be calculated as $$\phi_{s(X_i)}\left(\left(\sum_j \left(X^{-5^i}\right)^{\pm a_j} X^{-j}\right) \cdot ACC_{a \text{ or } b}\left(X^{-5^i}\right) \odot tmp\right)$$

and accumulated in ACC.

The processor 200 may perform the key switching on the variable-changed multiplication result. The key switching performed on the variable-changed multiplication result may be calculated as $ACC=ks_{s(X^5) \to s(X)}(ACC)$.

The processor 200 may reduce the number of times of the key switching from N−1 to 2 by taking advantage of the fact that the powers (exponents) of 5 and −5, instead of $X_i$, generates only mod 2N odd numbers.

In the examples of FIGS. 3 to 6, in order to perform the operation $ks_{s(X_i) \to s(X)}$ for all $i \in [1, N-1]$, it is necessary to perform key switching N−1 times, but in the example of FIG. 7, the processor 200 may perform the key switching only twice by performing only $ks_{s(X^{\pm 5}) \to s(X)}$, thereby reducing computation.

In operation 756, the processor 200 may store a generated target ciphertext in the ACC. In operation 770, when l is greater than or equal to h, the processor 200 may return the ACC.

Figure 8:
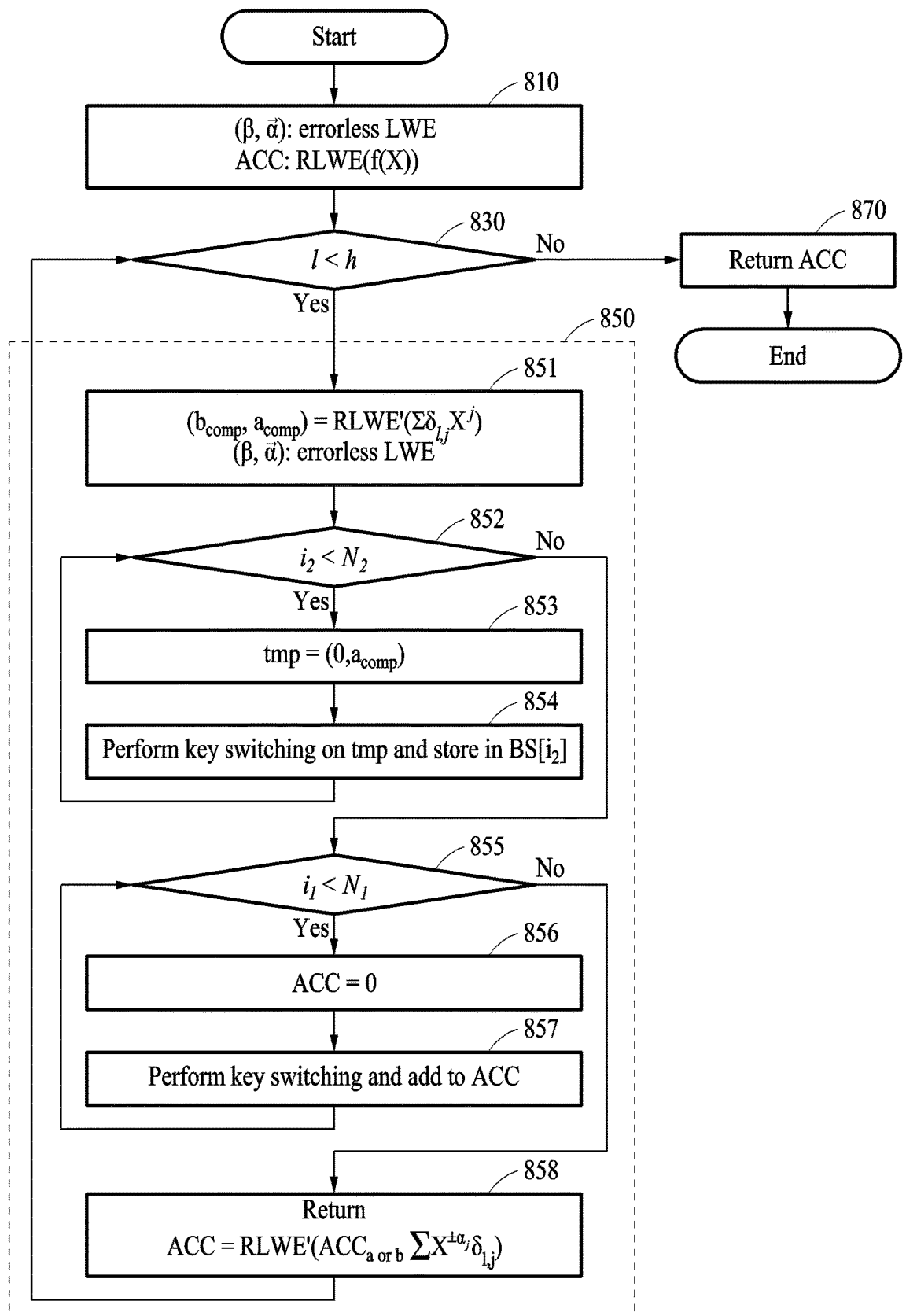
FIG. 8 illustrates still another example of a homomorphic encryption operation, according to one or more embodiments.

FIG. 8 illustrates still another example of a homomorphic encryption operation.

Referring to FIG. 8, in operation 810, a receiver (e.g., the receiver 100 of FIG. 1) may receive a blind rotation key and an operand ciphertext. For example, the ciphertext may include an errorless LWE. A processor (e.g., the processor 200 of FIG. 1) may assign RLWE(f(X)) to an ACC variable.

In operation 830, the processor 200 may determine whether l is smaller than h for a loop operation (l and h are natural numbers). When l is smaller than h, the processor 200 may repeatedly perform operation 850.

In operation 851, the processor 200 may obtain a parameter for performing the blind rotation operation based on the received blind rotation key (e.g., the RLWE' ciphertext) and operand ciphertext (e.g., the errorless LWE ciphertext).

In operation 852, the processor 200 may determine whether $i_2$ is smaller than $N_2$. While $i_2$ is smaller than $N_2$, the processor 200 may repeatedly perform operations 853 and 854.

The processor 200 may extract a common variable based on the operand ciphertext and the blind rotation key. In operation 853, the processor 200 may assign (0, $a_{comp}$) to a temporary ciphertext tmp. The processor 200 may extract a common variable based on the operand ciphertext and the blind rotation key. For example, a common variable may be (0, $a_{comp}$).

In operation 854, the processor 200 may generate a first key switching result by performing first key switching based on the common variable. The processor 200 may perform the key switching on the tmp and store it in BS[$i_2$].

In operation 855, the processor 200 may determine whether i, is smaller than $N_1$. While $i_1$ is smaller than $N_1$, the processor 200 may repeatedly perform operations 856 and 857. The processor 200 may generate the target ciphertext by performing the accumulative multiplication and second key switching based on the first key switching result. In operation 856, the processor 200 may assign 0 to the ACC. In operation 857, the processor 200 may perform the key switching and addition for the ACC. Here, $N_1$, $N_2$, $i_1$, and $i_2$ are natural numbers and $N=N_1N_2$.

In operation 858, the processor 200 may store a generated target ciphertext in ACC. In operation 870, when l is greater than or equal to h, the processor 200 may return ACC.

The example of FIG. 8 may show an example changed in a small-step large-step algorithm by combining the example of FIG. 3 and the example of FIG. 4. Through the example of FIG. 8, the processor 200 may reduce the computation order of the key switching from O(N) to $O(dN_1)+O(N_2)$ =$O(d\sqrt{N})$.

Figure 9:
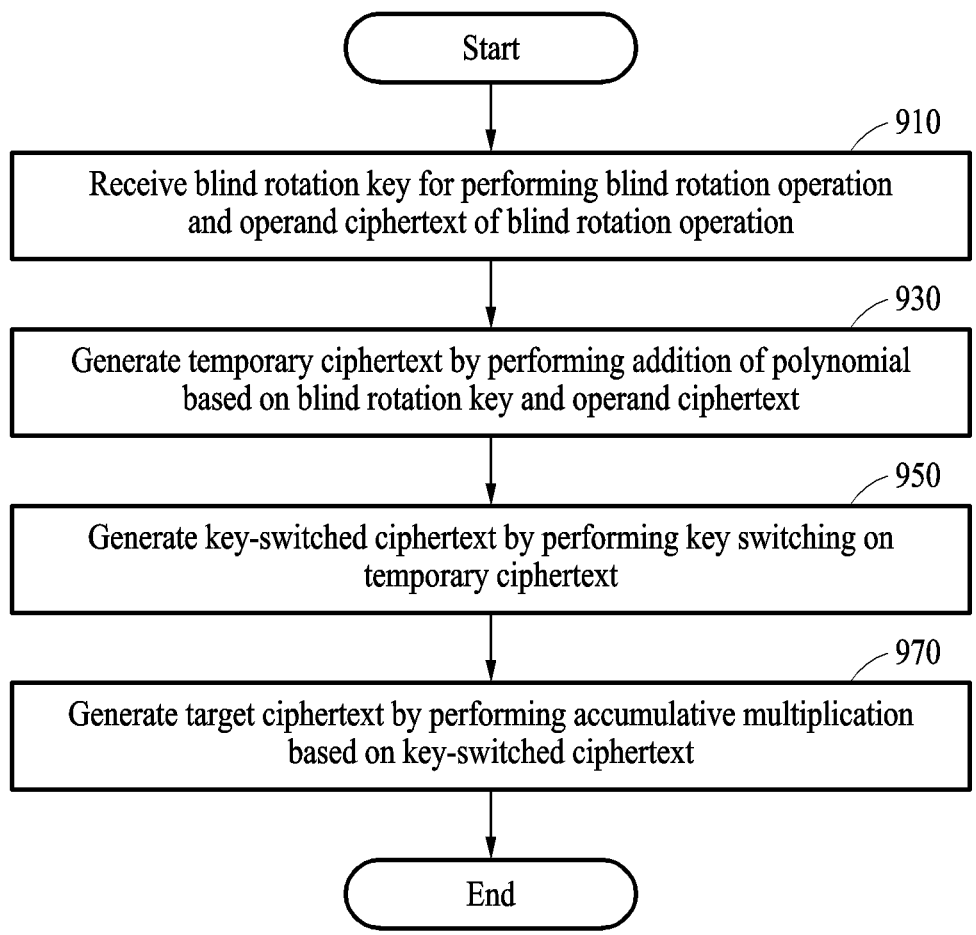
FIG. 9 illustrates an example of a homomorphic encryption operation, according to one or more embodiments.

FIG. 9 illustrates an example of an operation of the homomorphic encryption operation apparatus illustrated in FIG. 1.

Referring to FIG. 9, in operation 910, a receiver (e.g., the receiver 100 of FIG. 1) may receive a blind rotation key for performing a blind rotation operation and an operand ciphertext of the blind rotation operation. The operand ciphertext may be an LWE ciphertext.

In operation 930, a processor (e.g., the processor 200 of FIG. 1) may generate a temporary ciphertext by performing addition of a polynomial based on the blind rotation key and the operand ciphertext. The processor 200 may generate the temporary ciphertext based on a variable of a polynomial constituting the blind rotation key and based on an index corresponding to an odd exponent of the variable.

In operation 950, the processor 200 may generate a key-switched ciphertext by performing the key switching on the temporary ciphertext.

In operation 970, the processor 200 may generate the target ciphertext by performing the key switching and the accumulative multiplication based on the temporary ciphertext. The target ciphertext may be an RLWE ciphertext.

A Hamming weight of a secret key used to generate a blind rotation key is a natural number smaller than a predefined number.

The processor 200 may generate a target ciphertext in the form of an RLWE ciphertext by performing the accumulative multiplication based on an RLWE ciphertext based on a secret key of the operand ciphertext and the key-switched ciphertext.

The processor 200 may generate the target ciphertext by performing the accumulative multiplication on the key-switched ciphertext. The processor 200 may generate a first accumulative multiplication result by performing the accumulative multiplication based on the temporary ciphertext. The processor 200 may generate the target ciphertext by performing the key switching on the first accumulative multiplication result.

The processor 200 may extract a common variable based on the operand ciphertext and the blind rotation key. The processor 200 may generate the target ciphertext by performing the accumulative multiplication and the key switching based on the common variable.

The processor 200 may extract a common variable by using some components of the blind rotation key.

The processor 200 may generate a second accumulative multiplication result by performing the accumulative multiplication based on the common variable. The processor 200 may generate a key-switched second accumulative multiplication result by performing the key switching on the second accumulative multiplication result. The processor 200 may generate the target ciphertext by performing the multiplication of the key-switched second accumulative multiplication result by some terms of polynomials constituting the blind rotation key.

The processor 200 may generate a third accumulative multiplication result by performing the accumulative multiplication based on the common variable.

The processor 200 may generate a variable-changed multiplication result by changing a variable of a polynomial constituting the third accumulative multiplication result. The processor 200 may generate a key-switched multiplication result by performing the key switching on the variable-changed multiplication result. The processor 200 may generate the target ciphertext by performing the multiplication of the key-switched multiplication result by some terms of polynomials constituting the blind rotation key.

The processor 200 may generate a fourth accumulative multiplication result by performing the accumulative multiplication based on the common variable. The processor 200 may generate the fourth accumulative multiplication result by performing the accumulative multiplication of the common variable by an accumulative value corresponding to a variable corresponding to powers of 5 and −5 among variables (terms) of the blind rotation key.

The processor 200 may generate a multiplication result by performing the multiplication of the fourth accumulative multiplication result by some terms of polynomials constituting the blind rotation key. The processor 200 may generate a variable-changed multiplication result by changing a variable of a polynomial constituting the multiplication result. The processor 200 may generate the target ciphertext by performing the key switching on the variable-changed multiplication result.

The processor 200 may generate a first key switching result by performing first key switching based on the common variable. The processor 200 may generate the target ciphertext by performing the accumulative multiplication and second key switching based on the first key switching result.

The computing apparatuses, the electronic devices, the processors, the memories, the displays, the information output system and hardware, the storage devices, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A homomorphic encryption operation apparatus comprising:
   one or more processors; and
   a receiver device and memory storing instructions configured to, when executed by the one or more processors, cause the one or more processors to:
      receive, by the receiver device, a blind rotation key and an operand ciphertext;
      generate a first ciphertext by performing addition of a polynomial representation based on the blind rotation key and the operand ciphertext; and
      generate a target ciphertext by performing key switching and accumulative multiplication based on the first ciphertext,
   wherein the key-switching is performed on the first ciphertext which is a temporary ciphertext such that an order of key-switching is changed so that a computational load and memory within the homomorphic encryption operation apparatus required in a blind rotation operation is reduced.

2. The homomorphic encryption operation apparatus of claim 1,
   wherein a Hamming weight of a secret key is used to generate the blind rotation key.

3. The homomorphic encryption operation apparatus of claim 1, wherein
   the operand ciphertext is a learning with error (LWE) ciphertext, and
   the target ciphertext is a ring learning with error (RLWE) ciphertext.

4. The homomorphic encryption operation apparatus of claim 1, wherein the instructions are further configured to cause the one or more processors to:
   generate the first ciphertext based on a variable of a polynomial representation constituting the blind rotation key and based on an index corresponding to an odd exponent of the variable.

5. The homomorphic encryption operation apparatus of claim 1, wherein the instructions are further configured to cause the one or more processors to:
   generate the target ciphertext in the form of an RLWE ciphertext by performing the accumulative multiplication between an RLWE ciphertext and a key-switched ciphertext, where the RLWE ciphertest is generated based on a secret key of the operand ciphertext.

6. The homomorphic encryption operation apparatus of claim 1, wherein the instructions are further configured to cause the one or more processors to:
   generate a key-switched ciphertext by performing the key switching on the first ciphertext; and
   generate the target ciphertext by performing the accumulative multiplication based on the key-switched ciphertext.

7. The homomorphic encryption operation apparatus of claim 1, wherein the instructions are further configured to cause the one or more processors to:
   generate a first accumulative multiplication result by performing the accumulative multiplication based on the first ciphertext; and
   generate the target ciphertext by performing the key switching on the first accumulative multiplication result.

8. The apparatus of claim 1, wherein the key switching and the accumulative multiplication are performed simultaneously.

9. A homomorphic encryption operation apparatus comprising:
   one or more processors; and
   a receiver device and storage storing instructions configured to, when executed by the one or more processors, cause the one or more processors to:
      receive, from the receiver device, a blind rotation key and an operand ciphertext;
      extract a common variable based on the operand ciphertext and the blind rotation key; and
      generate a target ciphertext by performing accumulative multiplication and key switching based on the common variable,
   wherein the key-switching is performed on the accumulative multiplication where an order of key-switching is changed so that a computational load and memory within the homomorphic encryption operation apparatus required in a blind rotation operation is reduced.

10. The homomorphic encryption operation apparatus of claim 9, wherein a Hamming weight of a secret key is used to generate the blind rotation key.

11. The homomorphic encryption operation apparatus of claim 9, wherein
   the operand ciphertext is a learning with error (LWE) ciphertext, and
   the target ciphertext is a ring learning with error (RLWE) ciphertext.

12. The homomorphic encryption operation apparatus of claim 9, wherein the instructions are further configured to cause the one or more processors to:
   extract the common variable using some components of the blind rotation key.

13. The homomorphic encryption operation apparatus of claim 9, wherein the instructions are further configured to cause the one or more processors to:
   generate a second accumulative multiplication result by performing the accumulative multiplication based on the common variable;
   generate a key-switched second accumulative multiplication result by performing the key switching on the second accumulative multiplication result; and
   generate the target ciphertext by performing multiplication of the key-switched second accumulative multiplication result by some terms of polynomials constituting the blind rotation key.

14. The homomorphic encryption operation apparatus of claim 9, wherein the instructions are further configured to cause the one or more processors to:
   generate a third accumulative multiplication result by performing the accumulative multiplication based on the common variable;
   generate a variable-changed multiplication result by changing a variable of a polynomial representation constituting the third accumulative multiplication result;
   generate a key-switched multiplication result by performing the key switching on the variable-changed multiplication result; and
   generate the target ciphertext by performing multiplication of the key-switched multiplication result by some terms of polynomials constituting the blind rotation key.

15. The homomorphic encryption operation apparatus of claim 9, wherein the instructions are further configured to cause the one or more processors to:

generate a fourth accumulative multiplication result by performing the accumulative multiplication based on the common variable;

generate a multiplication result by performing multiplication of the fourth accumulative multiplication result by some terms of polynomials constituting the blind rotation key;

generate a variable-changed multiplication result by changing a variable of a polynomial representation constituting the multiplication result; and generate the target ciphertext by performing the key switching on the variable-changed multiplication result.

16. The homomorphic encryption operation apparatus of claim 15, wherein the instructions are further configured to cause the one or more processors to:

generate the fourth accumulative multiplication result by performing the accumulative multiplication of the common variable by an accumulative value corresponding to a variable corresponding to a power of 5 or −5 among variables of the blind rotation key.

17. The homomorphic encryption operation apparatus of claim 9, wherein the instructions are further configured to cause the one or more processors to:

generate a first key switching result by performing first key switching based on the common variable; and generate the target ciphertext by performing the accumulative multiplication and second key switching based on the first key switching result.

18. A homomorphic encryption operation method comprising:

receiving, from a receiver device connected to a homomorphic encryption operation apparatus, a blind rotation key and an operand ciphertext;

generating a first ciphertext by performing addition of a polynomial representation based on the blind rotation key and the operand ciphertext; and generate a target ciphertext by performing key switching and accumulative multiplication based on the first ciphertext, wherein the key-switching is performed on the first ciphertext which is a temporary ciphertext such that an order of key-switching is changed so that a computational load and memory within the homomorphic encryption operation apparatus required in a blind rotation operation is reduced.

19. The homomorphic encryption operation method of claim 18, wherein the generating of the first ciphertext comprises:

generating the first ciphertext based on a variable of a polynomial representation constituting the blind rotation key and an index corresponding to an odd exponent of the variable.

20. The homomorphic encryption operation method of claim 18, wherein the generating of the target ciphertext comprises:

generating a key-switched ciphertext by performing the key switching on the first ciphertext; and generating the target ciphertext by performing the accumulative multiplication based on the key-switched ciphertext.

21. The homomorphic encryption operation method of claim 18, wherein the generating of the target ciphertext comprises:

generating a first accumulative multiplication result by performing the accumulative multiplication based on the first ciphertext; and generating the target ciphertext by performing the key switching on the first accumulative multiplication result.

* * * * *